United States Patent Office 3,461,107
Patented Aug. 12, 1969

3,461,107
PROCESS FOR MAKING A POLYAMIDE
AND PRODUCT
Robert A. Hayes, Cuyahoga Falls, Ohio, assignor to The
Firestone Tire & Rubber Company, Akron, Ohio, a
corporation of Ohio
No Drawing. Filed Dec. 7, 1966, Ser. No. 599,722
Int. Cl. C08g 31/00, 20/08
U.S. Cl. 260—78                                    9 Claims

ABSTRACT OF THE DISCLOSURE

The method and composition resulting from addition of a low molecular weight alkyl ortho silicate to monomeric lactam of amino acid to form, upon polymerization, an exceptionally high molecular weight polyamide of improved viscosity.

The polyamide so prepared has utility in molding and extrusion grade materials, such as bearings and pipe made with conventional extrusion apparatus.

BACKGROUND OF THE INVENTION

As aforesaid, this invention relates to polyamides (nylons) and particularily those of high molecular weight. Considerable effort has been directed to producing such high molecular weight polymers. There is at least one reference where an attempt has been made to utilize silicon in a polyamide, that is, Patent No. 1,012,228 (British).

The preparation of nylon, a polyamide, as envisioned by the present invention, invloves the heating of lactam monomer at a temperature of about 225° C. to 275° C. for several hours in a sealed vessel, wherein polymerization takes place. The molecular weight of polymers prepared under such conditions depends primarily on the amount of water present as well as the time and temperature of the reaction. In any event, the molecular weight of the polymer is quite low and long periods of heating either under vacuum or in a continuous stream of inert gas are necessary to raise the molecular weight to the high level desired for some molding and extruding compounds.

It has now been discovered that the molecular weight of polyamides can be considerably raised by a step prior to the above mentioned polymerization wherein the lactam monomer is pretreated. By such a procedure high molecular weight polymers can be prepared without the necessity of long heating periods.

DESCRIPTION OF THE INVENTION

According to the present invention, lactam monomer of the general formula

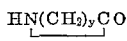

wherein $y$ is a number from 5–12, is admixed in a reaction vessel with a low molecular weight alkyl ortho silicate of the general formula

wherein R is an aliphatic saturated hydrocarbon radical of from 1 to 4 carbon atoms, in amounts of from 0.5 to 4 moles of silicate to each mole of lactam monomer, in a pretreating or preconditioning step. The reaction mixture of lactam monomer and silicate is heated to about 90° C. to 150° C. and from about 0.1 to 4 moles of water added per each mole of lactam monomer. The reaction mixture is retained at about 90° C. to 150° C. for about 12 hours. At the end of this period, the reaction mixture temperature is raised to from about 160° C. to 170° C. for a few hours. Alcohol is formed during the reaction and removed from the reaction mixture. The resulting product, a polylactam precursor, remaining in the reaction vessel, is now ready for polymerization.

Examples of $C_6$–$C_{13}$ lactam monomers of the present invention are the lactam derivatives of such acids as amino caproic, amino oenanthic, amino caprylic, amino pelarganic, amino capric, amino undecoic and amino lauric. Examples of $C_1$–$C_3$ alkyl ortho silicates are methyl ortho silicate, ethyl ortho silicate and propyl ortho silicate.

In the same reaction vessel, or if desired, in another reaction vessel, the polylactam precursor thus prepared, which includes the silicate, is subsequently polymerized with or without the presence of additional amounts of water and lactam monomer in a non-reactive atmosphere to a high molecular weight, as aforedescribed.

Molecular weights obtained by the process of the present invention have exceeded about 5.2 (45,000 molecular weight) relative viscosity measured by combining 1 gm. of polymer with 100 ml. concentrated sulfuric acid at 25° C.

The invention is illustrated by the following examples.

Example I (I–A).—452 gms. of ε-caprolactam and 208 gms. of ethyl ortho silicate were charged to a polymerization reactor equipped with a thermometer, stirrer, $N_2$ inlet and condenser. The mixture was heated to melting, about 90° C., and 200 ml. of water added. Thereupon the temperature was raised to 100° C.–120° C. and held 12 hours; the temperature was then raised to 160° C.–170° C. During the heating process, ethyl alcohol was formed. The reaction mixture was distilled until no more ethyl alcohol remained in the reaction mixture. The materials remaining in the reactor were cooled to 100° C. and stored.

Four samples, i.e. (a), (b), (c) and (d) below, were taken.

(I–B).—(a) 100 gms. of the mixture remaining in the reactor from (I–A) were combined with 5 ml. of water in a polymerization reactor, the reactor sealed, purged with nitrogen and heated for 12 hours, at 260° C.; (b) 75 gms. of the mixture remaining in the reactor from (I–A) were combined with 25 gms. of ε-caprolactam and 3.75 ml. of water; (c) 50 gms. of the mixture remaining in the reactor from (I–A) were combined with 50 gms. of ε-caprolactam and 2.50 ml. of water; (d) 25 gms. of the mixture remaining in the reactor from (I–A) were combined with 75 gms. of ε-caprolactam and 1.25 ml. of water.

(I–C).—Samples (b), (c) and (d) were placed in an oven at 125° C. for 12 hours to achieve homogeneity and subsequently polymerized at 260° C. for 12 hours. The resulting polymer was ground, washed and dried at 70° C.

The conversion of monomer to polymer of the samples was 76.3 percent, 84.3 percent, 72.9 percent and 82 percent, respectively. The plasticity of (a), (b), (c) and (d) was 1980, 4270, 6150 and 6800, respectively.

The plasticity was determined as follows. A 0.50 g. polymer sample was heated in an electrically heated Carver press at 250° C. under a pressure of 2,000 p.s.i. for 40 seconds. A film of polymer was thereby formed. The surface area (mm.²) of this film was measured. This surface area, measured in mm.², is the plasticity. Higher molecular weight polymers give correspondingly lower areas.

Example II 113 gms. of ε-caprolactam and 52 gms. of ethyl ortho silicate were mixed and heated to 120° C. in a sealed polymerization reactor equipped with a thermometer, stirrer and condenser. 5 ml. of water were added, stirred, and the mixture heated to 125° C. Ethyl alcohol was formed and collected in a separate container. The mixture remaining in the reactor was heated at 260° C. for 12 hours, the resultant polymer was ground and reheated at 260° C. in an open reactor under a nitrogen atmosphere. An extremely viscous polymeric melt resulted which was ground, washed and dried. The polymer plasticity was 3200. The relative viscosity was 5.38.

Having described the invention, it is claimed:

1. A method for the preparation of an improved polyamide comprising the steps of (a) combining a $C_6$–$C_{13}$ lactam monomer, and a low molecular weight alkyl ortho silicate, (b) heating to 90° to 150° C., (c) adding water and (d) maintaining the temperature from 90° C. to 150° C. for about 12 hours.

2. The method of claim 1 wherein the silicate is ethyl ortho silicate.

3. The method of claim 1 wherein by-product alcohol is formed and is removed from the reaction mixture.

4. The polyamide reaction product of claim 1.

5. The method of claim 1 wherein the monomeric lactam is ε-caprolactam and the monomeric silicate is ethyl ortho silicate.

6. The method of claim 1 which also includes the step of elevating the temperature of the reaction mass to from about 160° to about 170° C. and holding at said temperature until the evolution of alcohol terminates.

7. The method of claim 6 which also includes the steps of blanketing the reaction mass with nitrogen gas and polymerizing the reaction mass at a temperature of about 260° C. for a period of 12 hours.

8. The method of claim 6 which also includes the steps of adding additional water after the initial 12-hour heating period, and adding additional lactam monomer, and thereafter polymerizing the reaction mass at a temperature of about 260° C. for a period of about 12 hours.

9. The method of claim 8 in which the lactam monomer is ε-caprolactam and the silicate is ethyl ortho silicate.

References Cited

UNITED STATES PATENTS

| 2,902,468 | 9/1959 | Fianu | 260—46.5 |
| 3,341,501 | 9/1967 | Hedrick et al. | 260—78 |

OTHER REFERENCES

Kingzett, Chemical Encyclopedia, 1924, pp. 14–15, Van Nostrand Co.

DONALD E. CZAJA, Primary Examiner

M. I. MARQUIS, Assistant Examiner

U.S. Cl. X.R.

260—2, 46